United States Patent
Cherubim et al.

[11] 3,759,973
[45] Sept. 18, 1973

[54] MANUFACTURE OF 2,6-DIALKYL-3-SUBSTITUTED-6-(BETA-CYANOETHYL-CYCLOHEXENE-(2)-ONE AND PRODUCTS

[75] Inventors: Martin Cherubim, Rheinkamp-Erick; Faisal Abo Dagga, Rheinkamp-Utfort, both of Germany

[73] Assignee: Deutsche Texaco Aktiengesellschaft, Hamburg, Germany

[22] Filed: Mar. 3, 1971

[21] Appl. No.: 120,728

[30] Foreign Application Priority Data
Mar. 4, 1970 Germany................ P 20 10 124.0

[52] U.S. Cl............................ 260/464, 260/514 R
[51] Int. Cl.......................................... C07c 121/48
[58] Field of Search.................................. 260/464

[56] References Cited
UNITED STATES PATENTS
3,217,010  11/1965  Kühnis et al.................. 260/464 X
3,445,502  5/1969  Brown et al.................. 260/464 X OTHER PUBLICATIONS
Bruson, et al., J.A.C.S., 64 (1942) pp. 2850–2858.

*Primary Examiner*—Joseph P. Brust
*Attorney*—Thomas H. Whaley and Carl G. Ries

[57] ABSTRACT

2,6-dialkyl-3-amino-6-(beta-cyanoethyl)-cyclohexene-(2)-one (I) and 2,6-dialkyl-3-hydroxy-6-(beta-carboxyethyl)-cyclohexene-(2)-one (II) and manufacture comprising contacting a dialkyl ketone of the general formula:

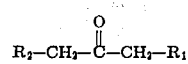

where $R_1$ and $R_2$ are alkyl of from one to five carbons with acrylonitrile in the presence of an alkaline catalyst and inert solvent to form I and contacting I with an aqueous metal hydroxide to form II.

4 Claims, No Drawings

MANUFACTURE OF 2,6-DIALKYL-3-SUBSTITUTED-6-(BETA-CYANOETHYL-CYCLOHEXENE-(2)-ONE AND PRODUCTS

The present invention relates to a process for producing 2,6-dialkyl-3-amino-6-($\beta$-cyanoethyl)-cyclohexene-(2)-ones, hereinafter referred to as DACO, and derivatives thereof.

It is known to obtain tri-cyanoethylated diethylketone by reacting 4 moles of acrylonitrile with 1 mole of diethyl ketone in about 90 grams of a solvent in the presence of about 10 grams of trimethylbenzylammonium hydroxide as a catalyst, in a yield of below 30 percent (cf. Journal Amer. Chem. Soc. Vol. 64 (1942), pp. 2850–58).

Surprisingly, it was found that 2,6-dialkyl-3-amino-6-($\beta$-cyanoethyl)-cyclohexene-2-ones represented by the structural formula

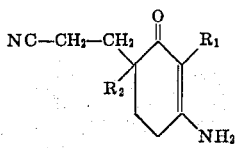

where $R_1$ and $R_2$ are equal or different alkyl and have from one to five carbon atoms, may be obtained by reacting dialkyl ketone represented by the structural formula:

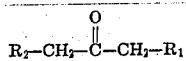

where $R_1$ and $R_2$ are as heretofore defined, with acrylonitrile in the presence of a basic catalyst in the molar ratio of from 5:1 to 1:4 in 300 to 5,000 grams of solvent per mole of acrylonitrile at temperatures ranging from 0° to 150°C.

Specific examples of said dialkyl ketone reactant are where $R_1$ and $R_2$ are methyl; $R_1$ is methyl and $R_2$ is propyl; and $R_1$ is ethyl and $R_2$ is isopentyl.

Preferred conditions include a dialkyl ketone to acrylonitrile molar ratio of from 3:1 to 1:2 in 500 to 3,000 grams of solvent per mole of acrylonitrile in the presence of an alkali metal hydroxide and/or alkali metal alcoholate.

The catalysts to be added may include basic compounds such as hydroxides, alcoholates or other alkaline compounds, in amounts of 0.005 to 0.5 mole per mole of acrylontrile. Specific examples are sodium hydroxide, potassium hydroxide, sodium methylate, potassium ethylate, and sodium t-butylate. As noted above alkanolates may be employed. The most favorable results were obtained with 0.01 to 0.2 mole of alkali metal hydroxide or alkali metal tert.-butylate.

Preferred reaction conditions are a contact time ranging from 0.2 to 50 hours and a temperature from about 0° to 150°C.

The formation of DACO is particularly surprising since this kind of cyclization has not hitherto been encountered. It is essential for this cyclization to add per mole of acrylonitrile 300 to 5,000 grams of an inert liquid solvent which under the conditions indicated above does not react with acrylonitrile. Suitable solvents include: secondary and tertiary alcohols, aliphatic and cyclic ethers such as tetrahydrofurane and dioxane, aliphatic and aromatic hydrocarbons and mixtures thereof. The best results were obtained with tertiary butanol.

By hydrolysis of the $NH_2$- and CN-groups of the DACO using for example aqueous alkali metal hydroxides (e.g., sodium hydroxide, potassium hydroxide) other compositions not yet known were obtained, namely 2,6-dialkyl-3-hydroxy-6-($\beta$-carboxyethyl)-cyclohexene-(2)-ones (DHCO). The hydrolysis is conducted at between about 50° and 100°C. until the evolution of ammonia ceases, e.g. 2–50 hours. Advantageously, the alkali metal hydroxide is employed as a 5 to 20 wt. percent aqueous solution in a mole ratio of between about 0.1 to 1 mole DACO per mole alkali metal hydroxide.

The composition and structure of the compounds of the invention were established by carbon, hydrogen, and nitrogen (CHN) analyses, identification of the functional groups, chemical analyses, UV-, IR, NMR- and mass spectrometry and the determination of the molecular weights.

Specific examples of the product derivative contemplated herein are

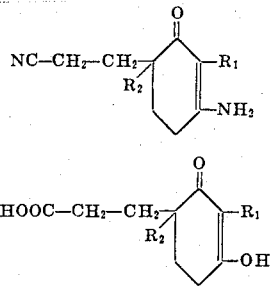

where $R_1$ and $R_2$ are methyl; $R_1$ is methyl and $R_2$ is propyl; and $R_1$ is ethyl and $R_2$ is isopentyl.

The compositions prepared according to this invention may be used as intermediate products for organic syntheses, such as for instance the production of cyclic amino-acids, esters, hydroxy acids and epoxide compounds, they may be used as intermediates in the production of polyamides, alkyd and ketone resins and also as modifying and curing agents for phenolic and epoxide resins. They are also useful as additives to lubricating oil and starting material for detergents.

The following examples are to illustrate the present invention without limiting the scope thereof:

EXAMPLE I

Preparation of 2,6-dimethyl-3-amino-6-($\beta$ cyanoethyl)-cyclohexene-(2-one.

323 grams is diethyl ketone (3.75 moles), 199 grams of acrylonitrile (3.75 moles) and 5,320 grams of tert.-butanol are refluxed with vigorous stirring under addition of 63 ml of a 10 percent aqueous potassium hydroxide solution. After 3 hours the reaction is terminated. The reaction mixture is removed by suction from the precipitated crystals of the 2,2,4-tri-($\beta$-cyanoethyl)-diethyl ketone. The mother liquor is diluted with distilled water, the $p_H$-value is adjusted to about 5 by means of concentrated hydrochloric acid, followed by extraction with chloroform. The aqueous phase is extracted with $CHCl_3$ two more times. The combined chloroform extracts were dried over sodium sulphate, filtered off and concentrated. The evaporation residue is dissolved in ethyl acetate. The crystals precipitated in the cold are recrystallized from ethyl acetate. 206 grams of 2,6-dimethyl-3-amino-6-(β-cyanoethyl)-cyclohexene-(2)-one are obtained.
Iodine number:
 calculated — 264.8 found — 266
Yield: 57.2 percent of theory
Melting point: 156° to 158°C.
CHN analysis:

|  | C | H | N | molec. weight |
|---|---|---|---|---|
| calc. | 68.7% | 8.4% | 14.6% | 192.85 |
| found | 68.7% | 8.6% | 14.8% | 194 |

EXAMPLE II

Preparation of 2,6-dimethyl-3-hydroxy-6-(β-carboxyethyl)-cyclohexene-(2)-one.

75 grams (0.39 mole) of 2.6-dimethyl-3-amino-6-(β-cyanoethyl)-cyclohexene-(2)-one are diluted with 600 ml of a 10 percent aqueous potassium hydroxide solution and refluxed until no more ammonia separates. This saponification takes about 30 hours. The mixture is then acidified with hydrochloric acid to a $p_H$-value of between 2 and 3. The precipitating crystals are removed by suction and washed with cold water. The product which is relatively pure now is recrystallized from dichloroethane or water. 76 grams of 2,6-dimethyl-3-hydroxy-6-(β-carboxyethyl)-cyclohexene-(2)-one are obtained having a melting point of between 161° and 163°C. The yield is 92 percent of theory.

We claim:

1. Process for the production of 2,6-dialkyl-3-amino-6-(β-cyanoethyl)-cyclohexene-(2)-ones represented by the general formula:

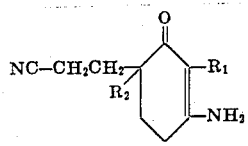

where $R_1$ and $R_2$ are the same or different alkyl of from one to five carbons, which comprises reacting a ketone having the general formula:

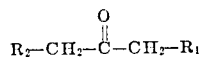

where $R_1$ and $R_2$ are as heretofore defined with acrylonitrile in a molar ratio ranging from 5:1 to 1:4 in 300 to 5,000 grams of an inert liquid solvent per mole of acrylonitrile in the presence of an alkaline catalyst selected from the group consisting of alkali metal hydroxide and alkali metal alkanolate at temperatures ranging from 0° to 150°C., said catalyst being present in an amount between 0.005 and 0.5 mole catalyst per mole acylonitrile.

2. The process according to claim 1, characterized in that the dialkyl ketones are reacted with acrylonitrile in a molar ratio ranging from 3:1 to 1:2 in 500 to 3,000 grams of a solvent per mole of acrylonitrile.

3. The compound of 2,6-dialkyl-3-amino-6-(β-cyano-ethyl)-cyclohexene-(2)-one, having the general formula

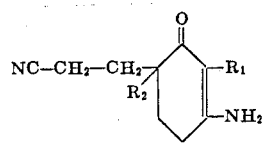

where $R_1$ and $R_2$ are equal or different alkyl and have from one to five carbon atoms.

4. The compound according to claim 3 wherein $R_1$ and $R_2$ are methyl.

* * * * *